March 17, 1959 — C. C. STUART — 2,878,052
TRAILER FOR TRANSPORTING TWO TRUCKS
Filed March 16, 1955 — 3 Sheets-Sheet 1

INVENTOR.
CLARENCE C. STUART
BY Barnes, Kisselle,
Laughlin & Raisch
ATTORNEYS

March 17, 1959
C. C. STUART
2,878,052
TRAILER FOR TRANSPORTING TWO TRUCKS
Filed March 16, 1955
3 Sheets-Sheet 2
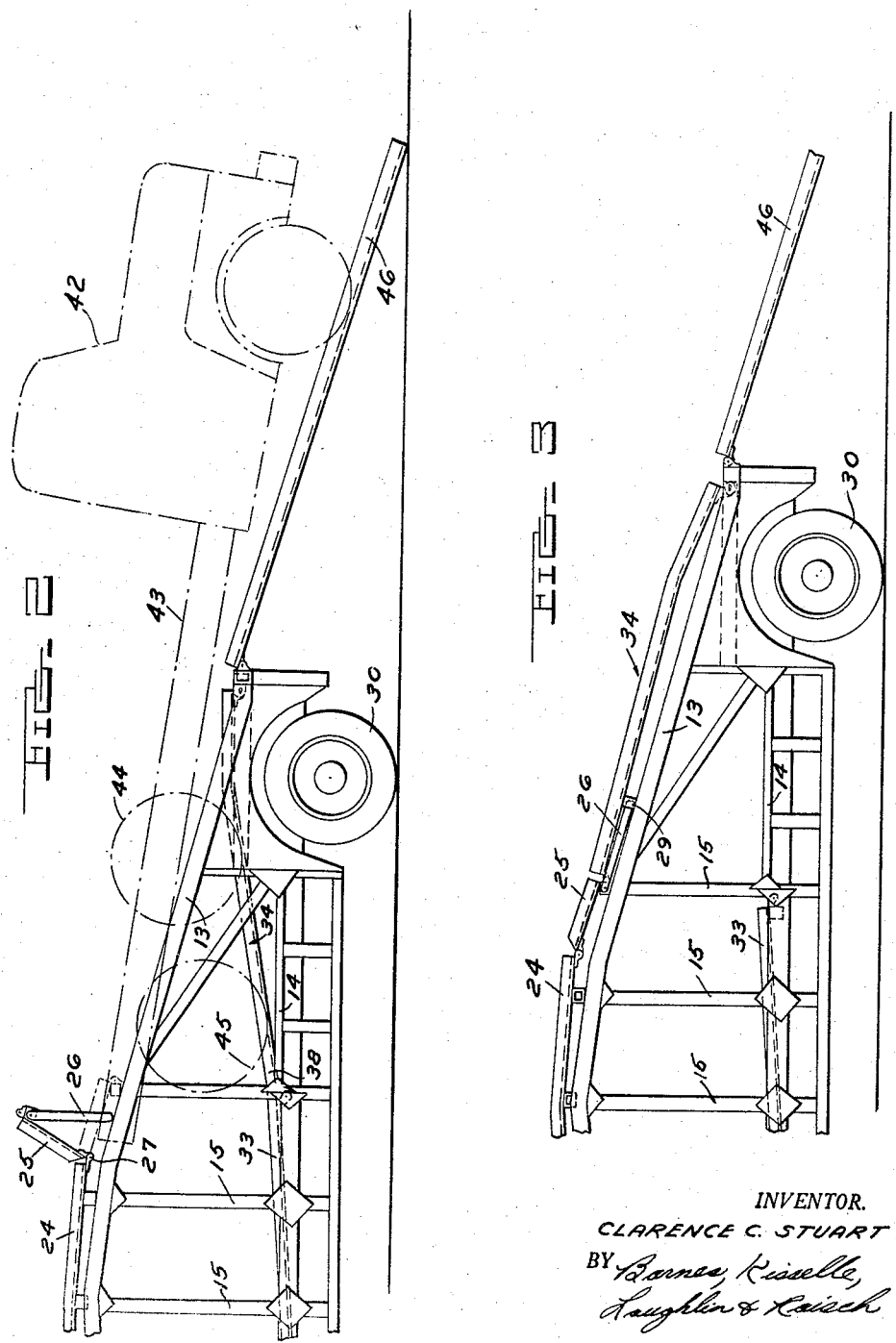
INVENTOR.
CLARENCE C. STUART
BY *Barnes, Kisselle,*
*Laughlin & Raisch*
ATTORNEYS

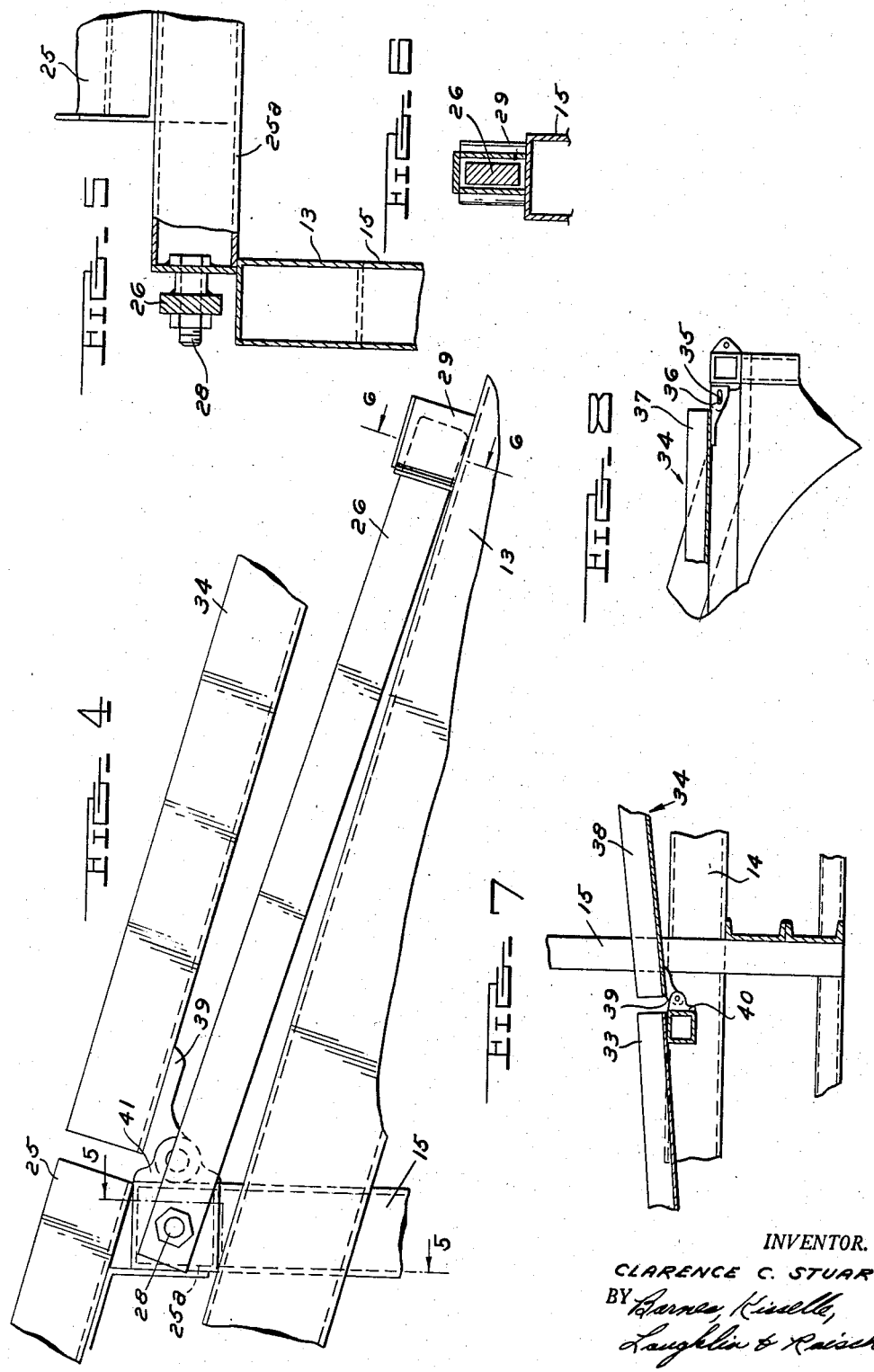

United States Patent Office 2,878,052
Patented Mar. 17, 1959

2,878,052

TRAILER FOR TRANSPORTING TWO TRUCKS

Clarence C. Stuart, Dearborn, Mich., assignor to Traffic Transport Engineering, Inc., Dearborn, Mich., a corporation of Michigan Application March 16, 1955, Serial No. 494,651

1 Claim. (Cl. 296—1)

This invention relates to a trailer for transporting vehicles and particularly to a trailer and method of loading said trailer for hauling a pair of trucks. The trucks which are to be transported include a cab and a frame and are adapted to have a body mounted thereon when they reach their destination.

According to one type of trailer which is currently used to transport motor vehicles, the trailer is pivotally connected to a truck tractor by a connection such as a fifth wheel.

It is an object of this invention to provide such a trailer adapted to transport trucks and having conventional length and height when loaded to comply with various state regulations as to length and height.

It is a further object of this invention to provide such a trailer for transporting trucks which weigh on the order of five tons each.

Basically, according to the invention, the trucks are supported on the trailer in superimposed relation with the cab of the upper truck facing in one direction toward the front of the trailer and the cab of the lower truck facing in the opposite direction toward the rear of the trailer. In addition, the frames of the trucks are inclined downwardly toward the front of the trailer. The cab of the upper truck generally overlies the fifth wheel of the trailer and the cab of the lower truck generally overlies the rear wheels of the trailer.

The trailer for supporting the trucks in this manner includes an upper and lower track each having parallel spaced and longitudinally extending track sections. The upper track terminates a short distance ahead of the rear end of the trailer. The lower track includes a rear inclined section which is adapted to swing upwardly into position for loading the upper track and downwardly into position for loading the lower track. In addition, the rearmost portion of the upper track is mounted for movement out of position in order to provide sufficient clearance for loading the lower track.

Referring to the accompanying drawings:

Fig. 2 is a fragmentary side elevational view showing the tracks of the trailer in position for loading the lower track.

Fig. 3 is a fragmentary side elevational view showing the tracks in position for loading the upper track.

Fig. 4 is a fragmentary side elevational view, on a greatly enlarged scale, of the upper track section which is movable out of position to facilitate loading of the lower track.

Fig. 5 is a fragmentary sectional view along the line 5—5 on Fig. 4.

Fig. 6 is a fragmentary sectional view along the line 6—6 on Fig. 4.

Fig. 7 is a sectional view of the track section shown in the circle 7 on Fig. 1.

Fig. 8 is a sectional view of the track section shown in the circle 8 on Fig. 1.

Figure 1:
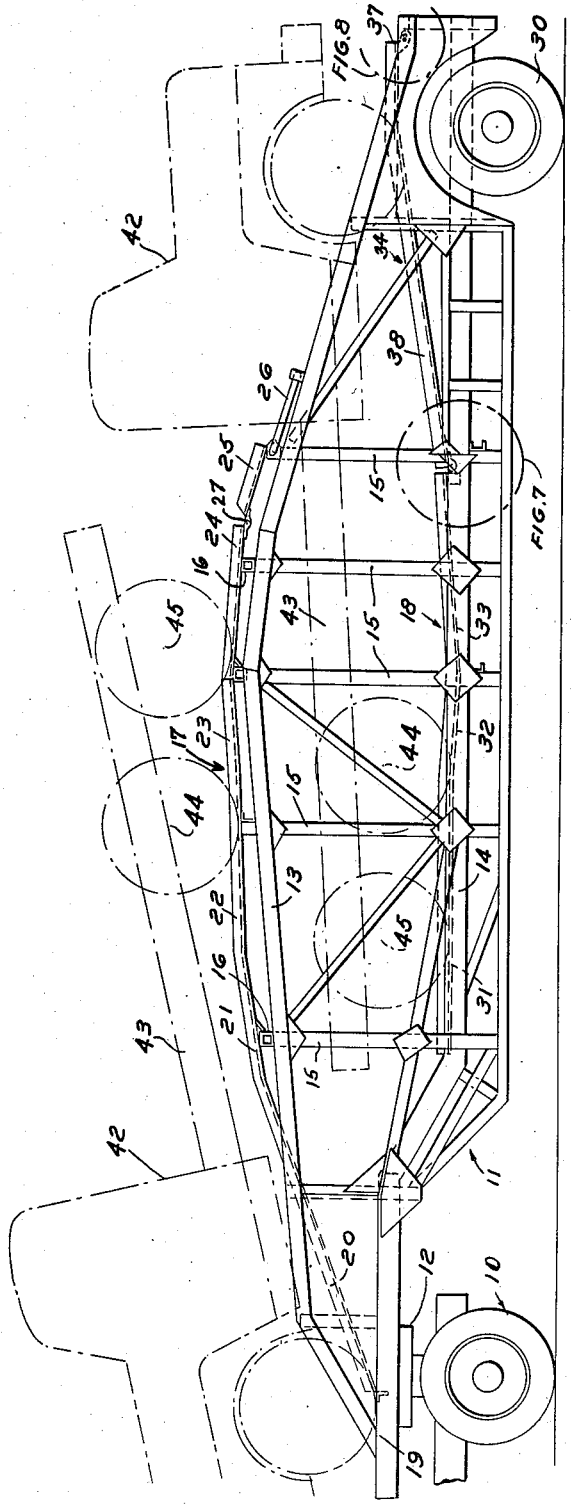
Fig. 1 is a side elevational view of a trailer embodying the invention, the trucks being shown in loaded position on the trailer.

Referring to Fig. 1, the tractor 10 is pivotally connected to trailer 11 by means of a fifth wheel 12 at the forward end of the trailer. The trailer includes a frame comprising longitudinally extending members 13, 14, vertical struts 15 and transverse struts 16. Upper track 17 and lower track 18 are mounted in substantially superimposed relationship on the trailer and include parallel spaced longitudinally extending track sections. The upper track 17 includes a short horizontal section 19 generally overlying the fifth wheel 12 and an inclined section 20 extending upwardly from the horizontal section and rearwardly to a slightly inclined section 21 which in turn is connected to a substantially horizontal section 22. The upper track also includes a slightly upwardly inclined section 23 extending from the horizontal section 22 and a slightly downwardly inclined section 24 extending toward the rear of the trailer. A short section 25 is pivotally connected as at 27 to the rear end of the inclined section 24 and in its normal lowered position is at a greater inclination than the section 24. As shown in Figs. 2 and 4, the pivoted section 25 is adapted to be pivoted upwardly and thereby provide sufficient clearance to permit a truck to be backed up onto the lower track. When in the uppermost pivoted position, the weight of the pivoted section 25 is supported by an arm 26 pivoted to the end of the section 25 as at 28 and adapted to be supported in a generally upright position by the longitudinally extending member 13. As shown in Figs. 4 and 6, the free end of the arm 26 is retained in a U-shaped holder 29 when the pivoted section 25 is in its lowermost position. In its lowermost position, section 25 is supported on member 13 by a transverse strut 25a which is welded to the underside of section 25.

As shown in Fig. 1, the lower track 18 extends from a point behind the fifth wheel and substantially underlying the slightly inclined section 21 of the upper track to the rear end of the trailer above rear wheels 30. The lower track includes a substantially horizontal section 31 connected to a slightly downwardly and rearwardly inclined section 32 which in turn is connected to a slightly upwardly inclined section 33. The lower track also includes a pivoted section 34 which is pivotally connected to the rearmost portion of the trailer, as shown in Fig. 8, by means of a pin 35 which rides in an elongated slot 36 thereby permitting limited longitudinal movement of the section 34.

Referring to Fig. 1, the pivoted section 34 in its lowermost position includes a substantially horizontal portion 37 extending forwardly and a downwardly inclined portion 38 extending downwardly and forwardly from the portion 37 into alignment with the inclined section 33. The forward end of the pivoted section 34 of the lower track is provided with a bracket 39 which may be connected by a pin to a bracket 40 on the lower track, as shown in Fig. 7, or to a bracket 41 on the upper track, as shown in Fig. 4.

The trailer which has been described is particularly adapted for transporting trucks which weigh approximately five tons and include a cab 42 and frame 43 and, in addition, have a pair of rear axles 44, 45.

The trailer is loaded as follows: With the pivoted section 25 of the upper track in lowered position, the pivoted section 34 of the lower track is swung upwardly and moved forwardly slightly to bring the bracket 39 into alignment with the bracket 41 on the upper track, as shown in Figs. 3 and 4. A ramp 46 is then placed in alignment with the rear end track 34. A truck is then driven up the ramp 46 onto the upper track into substantially the position shown in Fig. 1.

The pivoted section 34 of the lower track is then swung downwardly and moved slightly rearwardly to bring the bracket 39 into alignment with the bracket 40 on the lower track, as shown in Figs. 2 and 7. Slight longitudinal shifting movement of section 34 is permitted by the pin and slot connection 35, 36. The short pivoted section 25 of the upper track is then swung upwardly and held in its uppermost position by the arm 26. A truck is then backed onto the lower track, as shown in Fig. 2, the overhanging rear end of frame 43 clearing the upper track because of the clearance provided by the upper position of the pivoted section 25.

In loading the upper track, the greater inclination of the section 25 provides for a rapid rise of the rear wheels of the truck when the front wheels begin to move downwardly on the front end of the upper track and thereby prevents any parts on the under carriage of the truck from scraping or touching the upper track.

If necessary to provide proper clearance between the front end of the truck on the upper track and the cab of the tractor, the truck on the upper track may be backed rearwardly on the upper track after the lower truck has been loaded. Where dual wheels are used on the rear axles of the truck, it may be necessary to remove the outer wheels and mount them on the frame of the truck in order to provide clearance on the inside of the trailer, as shown on the truck on the lower track in Fig. 1.

After the trailer has been loaded, the trucks are in position with the cab of the upper truck overlying the fifth wheel 12 and facing toward the front end of the trailer, and the cab of the lower truck overlying the rear wheel 30 of the trailer and facing toward the rear of the trailer. The front wheels of the truck on the upper track are at a lower level than the rear wheels of the truck on the upper track while the front wheels of the truck on the lower track are above the level of the rear wheels of the truck on the lower track. In addition, the rear wheels of the upper truck are below the level of the top of the cab to the lower truck. The frames of the trucks are inclined downwardly toward the front of the trailer.

In this manner the trailer is loaded in a minimum length and height to insure compliance with the various state laws.

I claim:

A trailer for transporting a pair of trucks, each having a truck frame and a cab at one end of the truck frame, comprising a frame having a pivotal fifth wheel connection at one end thereof and rear wheels at the other end thereof, an upper track, a lower track, each of said tracks comprising parallel spaced longitudinally extending track portions mounted on the frame, said upper track having a first section inclined in a generally upward direction from a point overlying the fifth wheel connection toward the rear of the trailer and extending upwardly to the middle of the trailer and a second section inclined in a generally downward direction from the middle of the trailer a substantial distance toward the rear and terminating at a point short of the rear of the trailer, the rearmost portion of the second section of the upper track having a greater inclination than the remainder thereof whereby when the upper track is being loaded and the front wheels of a truck are moving down the forward section of the upper track the rear of the truck will be raised quickly by the portion having the greater inclination in order to prevent any portion of the truck undercarriage from scraping or contacting the upper track, the rearmost portion of the second section of the upper track being pivotally connected at its forward end to the remainder of said second section, the vertical distance between the rear end of said rearmost portion and the lower track being less than the height of a truck cab and greater than the height of a truck frame and providing insufficient clearance for the rear end of a truck when loading the lower track by backing a truck thereon, said rearmost portion being movable upwardly in order to provide sufficient clearance when loading the lower track as described, said lower track including a substantially horizontal section underlying the upper track at the middle of the trailer, and an inclined section extending upwardly and rearwardly from the horizontal section to a point overlying the rear wheels, said inclined section of the lower track being pivotally and slidably connected at its rear end to the trailer whereby it may be swung upwardly and moved bodily forwardly to bring its forward end into alignment with the rearmost pivoted portion of the upper track for loading a truck on the upper track, the forward end of the upper track lying in generally the same horizontal plane as the rear end of the lower track, the longitudinal distance between the rear end of the rearmost section of the upper track and the rear end of the lower track being substantially equal to the length of a truck cab.

References Cited in the file of this patent

UNITED STATES PATENTS

| | | |
|---|---|---|
| 2,169,648 | Judd | Aug. 15, 1939 |
| 2,452,270 | Stuart | Oct. 26, 1948 |
| 2,598,113 | Dawson | May 27, 1952 |
| 2,654,492 | Pressler | Oct. 6, 1953 |